ated under 35

United States Patent
Mazza et al.

(10) Patent No.: US 12,158,220 B2
(45) Date of Patent: Dec. 3, 2024

(54) BALL VALVE (71) Applicants: MAPREFIN S.R.L., Chiuduno (IT); GBS BLANKING S.R.L., Adrara San Martino (IT)

(72) Inventors: Livio Mazza, Chiuduno (IT); Alen Prestini, Chiuduno (IT); Simeone Belotti, Adrara San Martino (IT); Giovanni Belotti, Adrara San Martino (IT)

(73) Assignees: Maprefin S.r.l., Chiuduno (IT); GBS Blanking S.r.l., Adrara San Martino (IT)

( * ) Notice: Subject to any disclaimer, the term of this patent is extended or adjusted under 35 U.S.C. 154(b) by 8 days.

(21) Appl. No.: 18/249,516

(22) PCT Filed: Oct. 20, 2021

(86) PCT No.: PCT/IB2021/059655
§ 371 (c)(1),
(2) Date: Apr. 18, 2023

(87) PCT Pub. No.: WO2022/084876
PCT Pub. Date: Apr. 28, 2022

(65) Prior Publication Data
US 2023/0383851 A1 Nov. 30, 2023

(30) Foreign Application Priority Data
Oct. 20, 2020 (IT) .................. 102020000024766

(51) Int. Cl.
*F16K 5/06* (2006.01)

(52) U.S. Cl.
CPC .............. *F16K 5/0668* (2013.01); *F16K 5/06* (2013.01); *F16K 5/0663* (2013.01); *F16K 5/0673* (2013.01)

(58) Field of Classification Search
CPC .... F16K 5/0668; F16K 5/0673; F16K 5/0663; F16K 5/06
(Continued)

(56) References Cited

U.S. PATENT DOCUMENTS

| 4,147,327 A | * | 4/1979 | Moran | F16K 5/0668 251/181 |
| 4,272,054 A | * | 6/1981 | Zinnai | F16K 1/2266 251/173 |

(Continued)

FOREIGN PATENT DOCUMENTS

| DE | 1675412 A1 | 12/1970 |
| GB | 2140896 A | 12/1984 |

(Continued)

OTHER PUBLICATIONS

International Search Report for International Patent Application No. PCT/IB2021/059655, mailed Feb. 3, 2022.

*Primary Examiner* — Jessica Cahill
(74) *Attorney, Agent, or Firm* — Armstrong Teasdale LLP (57) ABSTRACT

A valve for intercepting a fluid in a duct is provided. The valve has a valve body, a ball shutter, and a sealing device for forming a fluid seal with an external surface of the ball shutter. The sealing device has a polymeric sealing ring located in contact with the external surface, and a metal support ring coupled to the sealing ring. The support ring has an annular coupling portion having an annular contact portion formed by a frustoconical wall, and an elastically bendable influencing portion, so as to form an elastic lever. In an emergency condition in which the sealing ring is absent the annular contact portion is in contact with the external surface of the ball shutter due to at least fluid pressure, forming the fluid seal even in the emergency condition.

11 Claims, 6 Drawing Sheets (58) Field of Classification Search
USPC .......................................... 251/315.1, 315.01
See application file for complete search history.

(56) References Cited

U.S. PATENT DOCUMENTS

| | | | | |
|---|---|---|---|---|
| 4,345,738 | A * | 8/1982 | Ripert | F16K 5/0673 |
| | | | | 251/315.08 |
| 4,396,199 | A * | 8/1983 | Boyd | F16K 1/2263 |
| | | | | 251/173 |
| 4,505,290 | A * | 3/1985 | Scobie | F16K 1/2266 |
| | | | | 251/173 |
| 7,367,544 | B2 * | 5/2008 | Oh | F16K 5/12 |
| | | | | 251/315.1 |
| 8,328,160 | B2 * | 12/2012 | Abel | F16K 25/00 |
| | | | | 251/315.01 |
| 2010/0200791 | A1 * | 8/2010 | Yung | F16K 5/0673 |
| | | | | 251/315.01 |
| 2010/0229962 | A1 * | 9/2010 | Frenzel | F16K 5/0673 |
| | | | | 251/315.1 |
| 2014/0319395 | A1 * | 10/2014 | Warbey | F16K 5/0678 |
| | | | | 251/185 |

FOREIGN PATENT DOCUMENTS

| | | | |
|---|---|---|---|
| GB | 2194315 | A | 3/1988 |
| GB | 2305489 | A | 4/1997 |

* cited by examiner

BALL VALVE

CROSS-REFERENCE TO RELATED APPLICATIONS

This application is a National Stage Application of International Patent Application No. PCT/IB2021/059655, having an International Filing Date of Oct. 20, 2021, which claims priority to Italian Application No. 102020000024766, filed Oct. 20, 2020, the entire contents of each of which are hereby incorporated by reference herein.

FIELD OF THE INVENTION

This invention is in the field of ball valves and relates in particular to a ball valve provided with a particularly effective sealing device, capable of ensuring the seal between the shutter and the valve body even under severe conditions, for example in fire conditions. This valve is suitable for managing a flow of a generic fluid, liquid or gaseous.

BACKGROUND OF THE INVENTION

In general, it is extremely important for a ball valve, used, for example, to shut off a gas or water supply line, to be able to maintain a closed condition between the inlet and outlet even in the event of a fire.

In this regard, the problem is mainly due to the sealing rings provided between the shutter and the valve body, which are made of polymeric materials usually with poor resistance to high temperatures. It often happens that, even if the valve is in the closed configuration, due to the high temperatures reached during a fire, the sealing rings lose consistency or even melt, causing the passage of fluid from the inlet to the outlet.

It is for this reason that some industry regulations require that, even in the event of a fire, ball valves continue to maintain a closed condition between the inlet and outlet for at least thirty minutes, which is estimated as the time required for operators, such as firefighters, to intervene and close the general supply valves of the systems.

SUMMARY OF THE INVENTION

The object of this invention is to provide a ball valve which is capable of satisfying the aforesaid requirements.

Said object is achieved by a ball valve as described and claimed herein. Advantageous embodiments of the present invention are also described.

BRIEF DESCRIPTION OF THE FIGURES

The features and advantages of the ball valve according to this invention will become apparent from the following description, given by way of non-limiting example in accordance with the figures in the accompanying drawings, wherein.

DETAILED DESCRIPTION

With reference to FIG. 1 through 5, a ball valve according to one embodiment of the invention is collectively denoted with 1.

The ball valve 1 comprises a valve body 2 comprising an annular wall 4 delimiting an internal compartment 6, in which an inlet 8 and an outlet 10 for the fluid are defined.

The ball valve 1 further comprises a ball shutter 12, housed in a space 14 of the internal compartment 6, located between the inlet 8 and the outlet 10. The shutter 12, having an external surface 12a, is provided with a typically diametral hole 16 between the inlet side and the outlet side.

The shutter 12 is rotatable about a rotation axis Z between an angular resting position (FIG. 1), wherein it closes the fluidic connection between the inlet 8 and the outlet 10 (closed configuration of the valve), and an angular opening position, in which the hole 16 re-establishes the fluidic connection between the inlet 8 and the outlet 10 (open configuration of the valve).

Usually, the angular opening position is set at 90° to the angular closing position.

Preferably, moreover, the valve body 2 comprises a neck 18 coaxial to the rotation axis Z, which delimits a stem passage 20.

The valve 1 further comprises a stem 22 engaged with the shutter 12, protruding outside of the valve body 2 through the neck 18; the stem 22 is sealingly rotatable in said stem passage 20 to maneuver the valve from the closed configuration to the open configuration and vice versa.

The space 14 wherein the shutter 12 is received is defined between a first shoulder 24 on the inlet side 8 and a second shoulder 26 on the outlet side 10. Said shoulders 24, 26 each comprise an annular prominence projecting from the annular wall 4 into the internal compartment 6.

The valve 1 further comprises at least one sealing device 30, 32 and preferably a first sealing device 30 on the inlet side 8 and a second sealing device 32 on the outlet side 10.

Each sealing device 30, 32 is placed within the space 14, abutting against the respective shoulder 24, 26, and forms a seal with the external surface 12a of the shutter 12.

Figure 1:
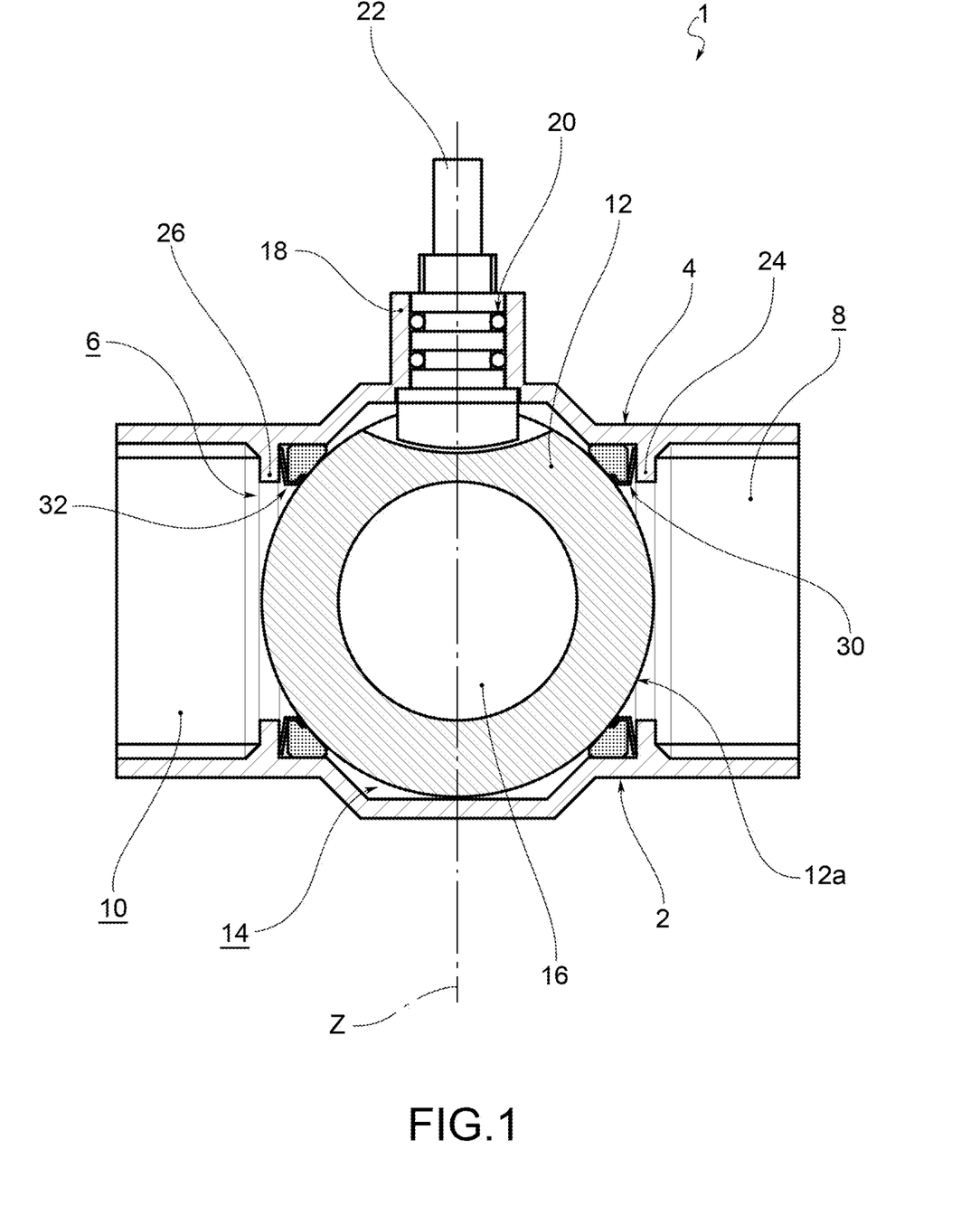
FIG. 1 schematically shows a ball valve according to one embodiment of this invention, in a closed configuration.
Figure 2:
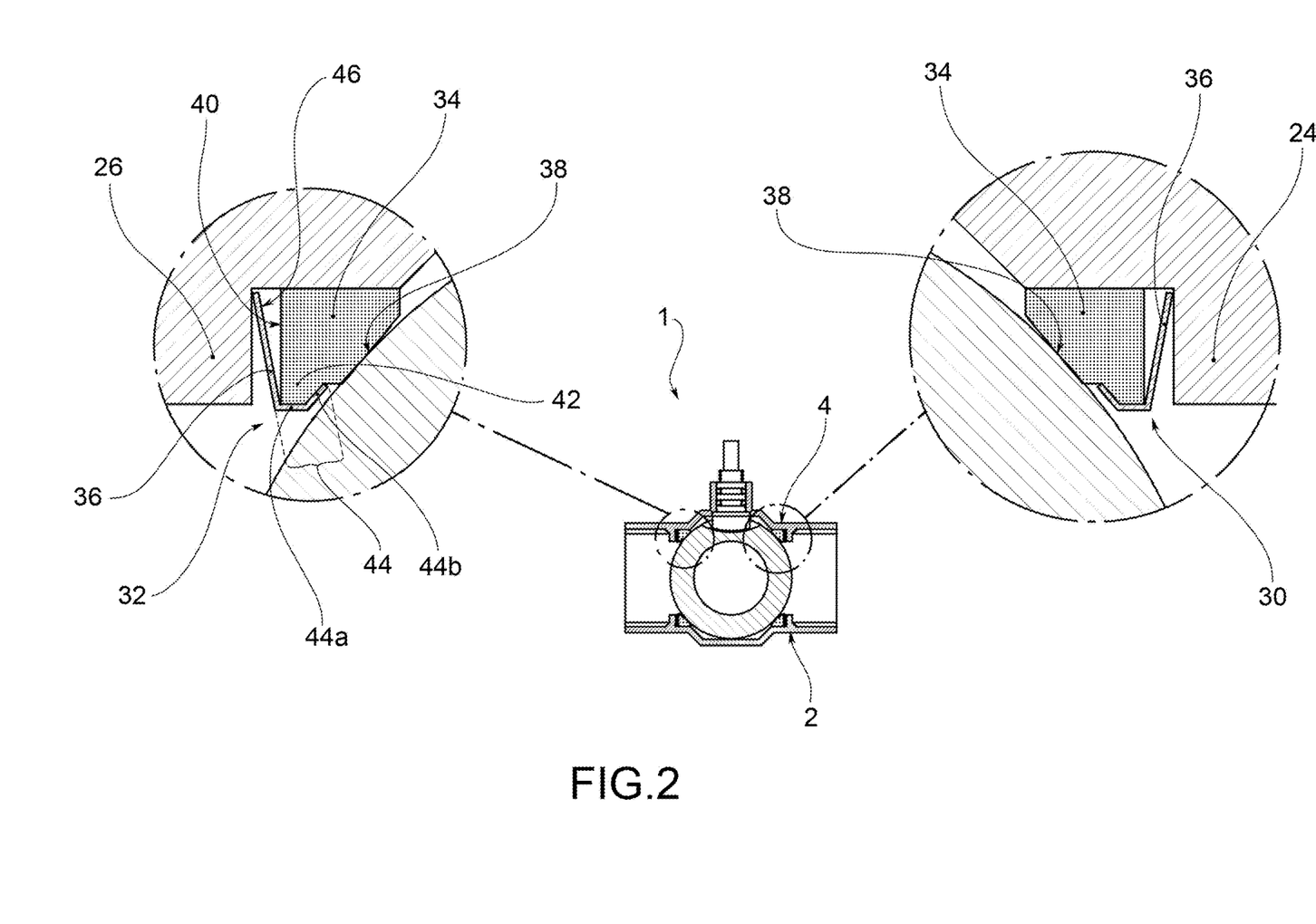
FIG. 2 shows the ball valve in FIG. 1 and the enlargement of boxes showing sealing devices of the valve.

The sealing device 30, 32 comprises a continuous sealing ring 34 made of a polymeric material and placed in contact with the external surface 12a of the shutter 12. For example, the sealing ring 34 is made of PTFE (polytetrafluoroethylene), POM (polyoxymethylene), nylon (polyamide).

The sealing device 30, 32 further comprises a continuous support ring 36 made of a metal material, which is connected to the sealing ring 34. For example, the support ring 36 is located between the sealing ring 34 and the shoulder 24, 26.

For example, the support ring is made of steel, such as stainless steel or carbon steel.

In general, the sealing ring is made of a first material having a first melting temperature and the support ring is made of a second material having a second melting temperature, and the first melting temperature is less than the second melting temperature.

Preferably, the sealing ring 34 has a shaped cross section and the support ring 36 has a counter-shaped cross section with respect to a portion of the cross section of the sealing ring 34, so as to achieve a shape coupling therebetween so that the support ring 36 is fixed to and supports the sealing ring 34.

In particular, the sealing ring 34 has a frustoconical contact surface 38 in contact with the external surface 12a of the shutter, and a front face 40 in the form of a circular crown, coaxial to the contact surface 38.

Preferably, the sealing ring 34 also has an annular foot 42, delimited by a portion of said front face 40, which protrudes radially internally with respect to said contact surface 38.

The support ring 36 comprises a continuous annular coupling portion 44 connected to the sealing ring 34 and a continuous annular influencing portion 46 joined to the coupling portion 44 and preferably elastically bendable relative thereto to provide an elastic lever between the sealing ring 34 and the shoulder 24, 26.

According to the invention, the coupling portion 44 comprises a contact portion 44b that is annular and comprises a frustoconical wall.

For example, the coupling portion 44 comprises an annular connecting portion 44a and the annular contact portion 44b, preferably contiguous, inclined towards each other, and resembling the shape of the foot, to which the coupling portion 44 is coupled. For example, the connecting portion 44a comprises a cylindrical wall defining the axis of the support ring 36, while the contact portion 44b comprises a frustoconical wall divergent from the first portion. The connecting portion 44a is connected at one end to the contact portion 44b and at the other end is connected to the influencing portion 46.

For example, the influencing portion 46 comprises a frustoconical wall converging towards the coupling portion 44.

Preferably, the sealing device 30, 32 is configured so that, inserted into the space between the shoulder 24, 26 and the external surface 12a of the shutter, the influencing portion 46 is elastically deformed with respect to the resting condition, e.g., by bending, with respect to the coupling portion 44, so that the sealing ring 34 is pushed towards the external surface 12a of the shutter 12 and the contact surface 38 operates effectively for fluid sealing.

Figure 3:
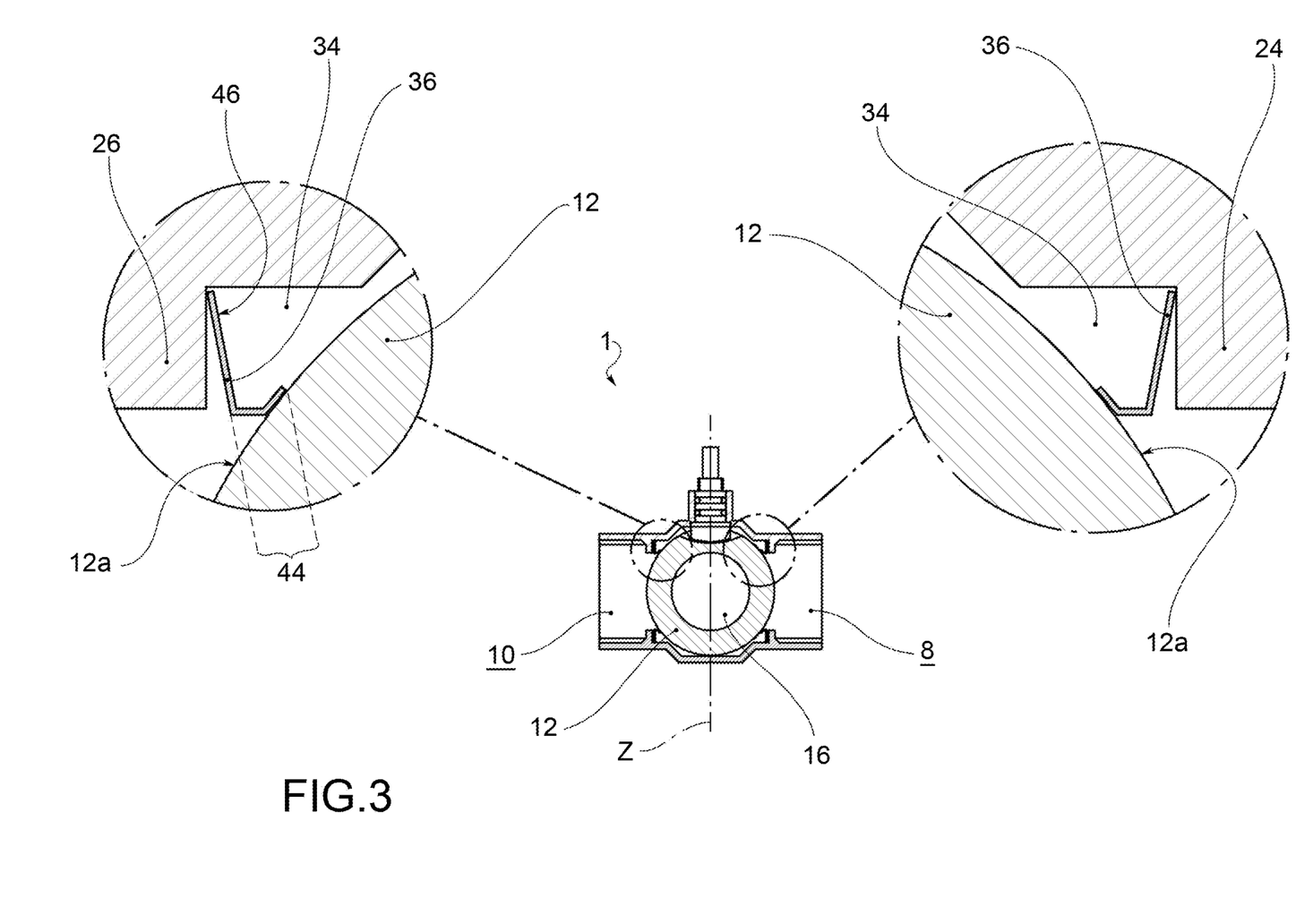
FIG. 3 shows a ball valve according to the invention, in a condition wherein the sealing ring is absent.

Following a fire, it is possible for the sealing ring, being made of polymeric material, to melt, leaving only the support ring between the shoulder and the external surface of the shutter (FIG. 3).

In said emergency condition, due to the pre-tensioning of the support ring 36, the support ring 36 tends to return to the resting condition, so that, under the thrust action of the influencing portion 46, at least one section of the coupling portion 44 comes into contact with the external surface 12a of the shutter 12, forming a fluid seal.

According to the present invention, the contact portion 44b of the coupling portion 44 is brought into contact with the external surface 12a, forming the fluid seal.

In other words, in a normal operating condition, the support ring 36 is at least partially deformed elastically with respect to a resting condition so as to push the sealing ring 34 towards the external surface 12a of the shutter 12, and in an emergency condition wherein the sealing ring 34 is absent, at least one section of the support ring 36 is in contact with the external surface 12a of the shutter 12, forming a fluid seal.

Figure 4:
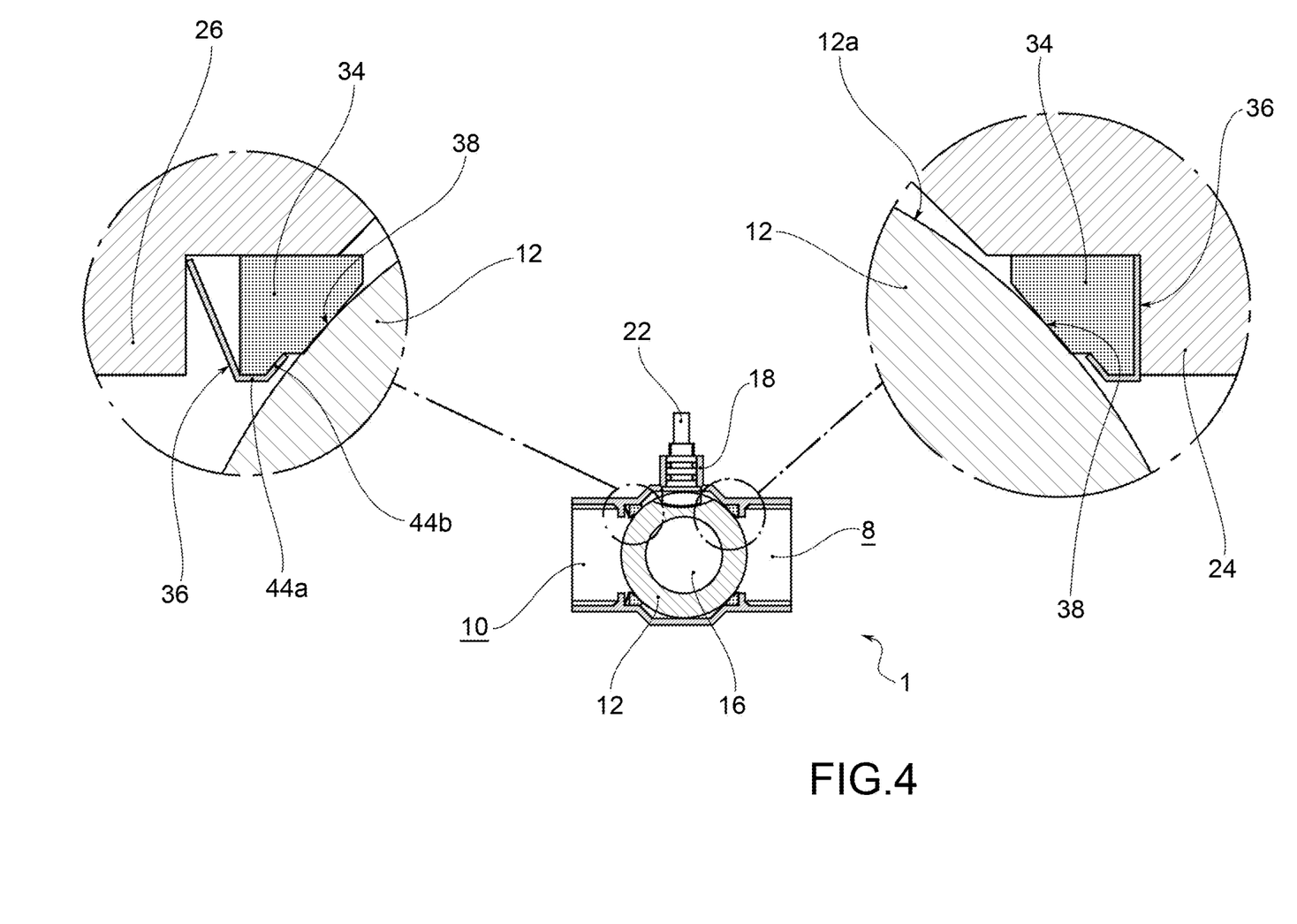
FIG. 4 shows a ball valve according to the invention under a fluid overpressure condition.

Furthermore, the valve according to this invention has a particularly advantageous behavior in case of sudden overpressure on the inlet side or outlet side (FIG. 4).

An overpressure on one side of the valve, for example on the outlet side, causes a crushing and advancing of the sealing ring 34 located on that side (for example, outlet 10) and a partial release of the pre-tensioning of the corresponding support ring 36 and, on the opposite side, for example on the inlet side, a crushing and retraction of the corresponding sealing ring 34 and an increase in the pre-tensioning of the corresponding support ring 36.

This behavior facilitates the absorption of the overpressure and, once this overpressure condition is over, the elasticity of the support ring allows the preceding condition to be easily re-established.

According to one embodiment of the invention (FIG. 5), the sealing device 30, 32 comprises an O-ring 50 arranged in an annular seat 52 formed in the sealing ring 34.

Figure 5:
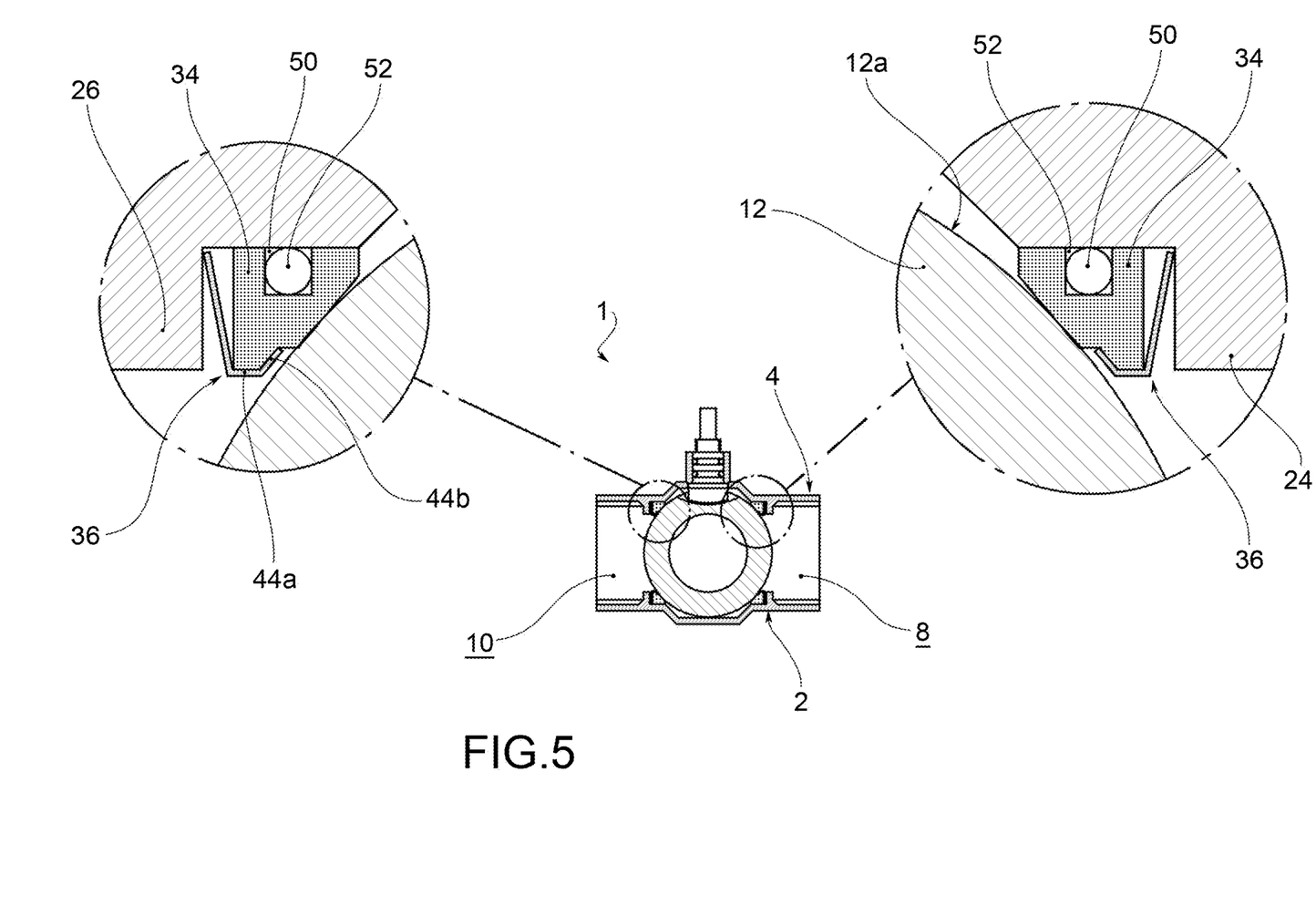
FIG. 5 shows a ball valve according to a further embodiment of the invention.

For example, the seat 52 is open radially outward from the O-ring 34 so that the O-ring 50 is in contact with the side surface of the annular wall 4 of the valve body 2, within the space 14.

According to further embodiments of the invention (FIG. 6a, 6b, 6e), the sealing ring 34 is connected by interference to the support ring 36.

Figures 6A, 6B, 6C, 6D, 6E:
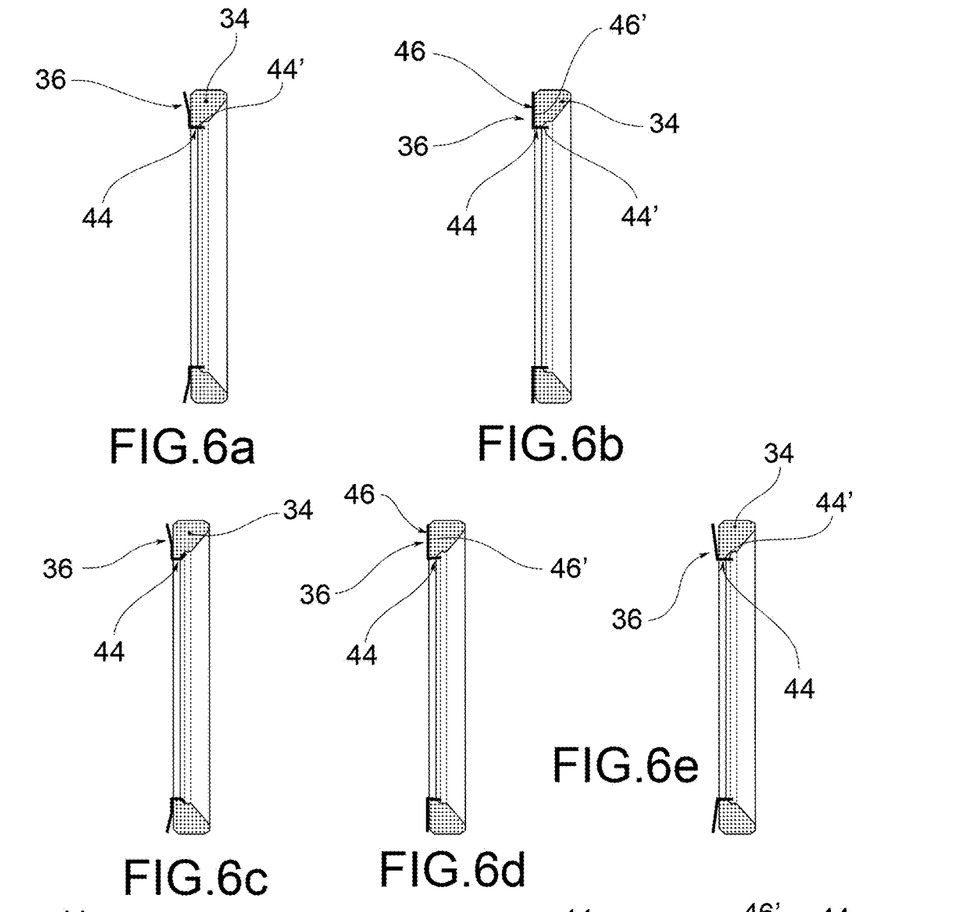
FIG. 6a through 6i shows further embodiments of sealing devices according to this invention.
Figure 6F:
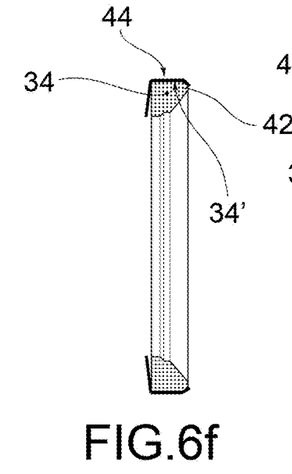
Figures 6G, 6H:
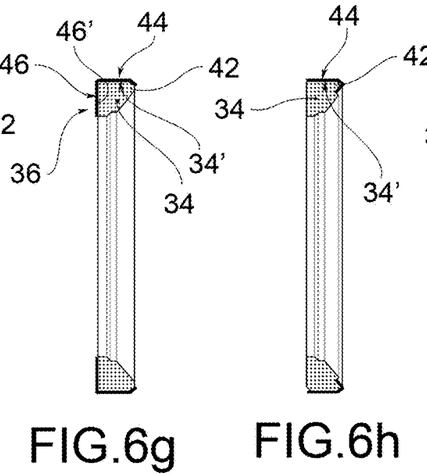
Figure 6I:
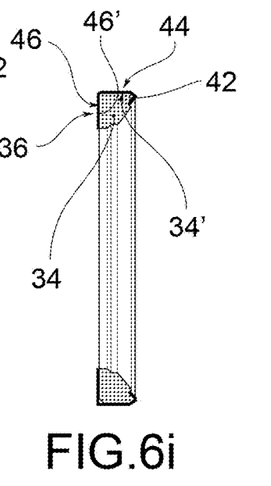

According to another aspect, the coupling portion 44 is a cylindrical wall 44' arranged radially internally to the sealing ring 34, which is fitted with interference onto said coupling portion 44.

According to another aspect (FIGS. 6b, 6d, 6g and 6i), the support ring 36 comprises an influencing portion 46 made up of a wall in the form of a circular crown 46', lying in an imaginary plane orthogonal to the axis of the support ring 36. In said embodiments, even in the valve assembly configuration, the influencing portion 46 does not exert any thrust action on the sealing ring. In the absence of the sealing ring, for example as a result of a fire, the sealing contact between the support ring 36 and the outer surface 12a of the shutter 13 is achieved by the clearance with which the shutter is housed in the space 14 and the displacement that the shutter undergoes by the pressure of the fluid.

According to further embodiments (FIGS. 6f, 6g, 6h and 6i), the coupling portion 44 is arranged radially outwardly to the support ring 36 and is connected to an external surface 34' of the sealing ring 34. In said embodiments, the foot 42 of the sealing ring 34 protrudes radially outwardly from the contact surface 38, and the coupling portion 44 couples to the sealing ring 34 with shape coupling.

According to another aspect (FIG. 6h), the support ring 36 is devoid of the influencing portion 46. In the absence of the sealing ring, for example as a result of a fire, the sealing contact between the support ring 36 and the outer surface 12a of the shutter 13 is made by the clearance with which the shutter is received in the space 14 and the displacement that the shutter undergoes by the pressure of the fluid.

Innovatively, the valve according to this invention solves the aforesaid problem in that following a fire, in the event that the sealing ring should melt, it is able to maintain the seal to the fluid.

Advantageously, the valve according to the invention is also able to easily withstand overpressure, for example due to water hammer, and to easily restore the condition of the seals when the overpressure has been exhausted.

Advantageously, the contact portion consisting of a frustoconical wall, in the emergency condition wherein the sealing ring is absent, allows for a fluid seal to be made without damaging and scratching the ball shutter since the support surface is flat and tangent thereto.

According to an advantageous aspect, moreover, the valve according to the invention tolerates scale formation very well, as the elastic deformation of the support ring is able to absorb dislocations caused by scale particles.

According to a further advantageous aspect, the valve according to the invention exhibits excellent sealing even at low temperatures. In said conditions, in effect, the sealing ring tends to shrink, but the support ring, relaxing, tends to compensate for the shrinkage, maintaining the fluid seal.

According to a still further advantageous aspect, the valve according to the invention manifests excellent operation in combination with actuators, for example electric actuators, as the torque required to rotate the shutter is significantly lower than solutions of the prior art.

It is understood that a person skilled in the art, in order to meet contingent needs, may make modifications to the valve described above, all of which are contained within the scope of protection as defined by the following claims.

The invention claimed is:

1. A valve for intercepting a fluid in a duct, the valve comprising:
 a valve body comprising an annular wall delimiting an internal compartment, an inlet and an outlet for the fluid being defined in the internal compartment, and a first shoulder and a second shoulder, internally radially protruding from the annular wall, a space being defined between the first and second shoulders;
 a ball shutter, accommodated with clearance in the space of the internal compartment, having an external surface and being rotatable about a rotation axis between an angular closing position and an angular opening position;
 a sealing device placed inside the space, abutting against a respective shoulder, suitable for obtaining a fluid seal with the external surface of the ball shutter;
 wherein the sealing device comprises a continuous sealing ring made of polymer material, placed in contact with the external surface of the ball shutter, and a continuous support ring made of metal material, coupled to the continuous sealing ring and placed between the continuous sealing ring and the shoulder;
 wherein the continuous support ring comprises a continuous annular coupling portion connected to the continuous sealing ring and a continuous annular influencing portion joined to and elastically bendable with respect to the annular coupling portion to provide an elastic lever between the continuous sealing ring and the shoulder;
 wherein the annular coupling portion comprises an annular contact portion formed by a frustoconical wall;
 wherein, in a normal use condition, an outer wall of the continuous sealing ring is at least partially in contact with a side surface of the annular wall and the annular contact portion is not in contact with the external surface of the ball shutter; and
 wherein, in an emergency condition, in which the continuous sealing ring is absent, the annular contact portion is in contact with the external surface of the ball shutter at least due to pressure of the fluid, obtaining the fluid seal.

2. The valve of claim 1, wherein the annular coupling portion further comprises an annular connecting portion comprising a cylindrical wall, and wherein the annular connecting portion is connected at one end to the annular contact portion and at the other end to the continuous annular influencing portion.

3. The valve of claim 2, wherein the continuous sealing ring is made of a first material having a first melting temperature and the continuous support ring is made of a second material having a second melting temperature, and wherein the first melting temperature is lower than the second melting temperature.

4. The valve of claim 1, wherein, in a usual operating condition, the continuous support ring is at least partially elastically deformed with respect to a resting condition, so as to push the continuous sealing ring towards the external surface of the ball shutter.

5. The valve of the claim 4, wherein the continuous sealing ring has a frustoconical contact surface in contact, in said usual operating condition, with the external surface of the ball shutter.

6. The valve of claim 1, wherein the continuous sealing ring has a shaped cross section, and the continuous support ring has a counter-shaped cross section with respect to a portion of the cross section of the continuous sealing ring, so as to obtain a shape coupling therebetween, so that the continuous support ring is engaged with and supports the continuous sealing ring.

7. The valve of claim 1, wherein the continuous annular influencing portion consists of a frustoconical wall converging towards the annular coupling portion.

8. The valve of claim 1, wherein the sealing device comprises an O-ring arranged in an annular seat formed in the continuous sealing ring, the O-ring being in contact with a side surface of the annular wall of the valve body inside the space for obtaining the fluid seal.

9. The valve of claim 1, wherein the continuous sealing ring is made of polytetrafluoroethylene (PTFE), polyoxymethylene (POM), or polyamide.

10. The valve of claim 1, wherein the continuous support ring is made of steel.

11. The valve of claim 10, wherein the steel is stainless steel or carbon steel.

\* \* \* \* \*